United States Patent
Kumar et al.

(10) Patent No.: US 10,805,346 B2
(45) Date of Patent: Oct. 13, 2020

(54) PHISHING ATTACK DETECTION

(71) Applicant: FireEye, Inc., Milpitas, CA (US)

(72) Inventors: Venkata Satya Phani Pavan Chitturi Kumar, Mountain View, CA (US); Surya Prakash Rao, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 264 days.

(21) Appl. No.: 15/721,948

(22) Filed: Oct. 1, 2017

(65) Prior Publication Data

US 2019/0104154 A1 Apr. 4, 2019

(51) Int. Cl.

| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06N 20/00 | (2019.01) |
| G06Q 10/10 | (2012.01) |

(52) U.S. Cl.
CPC ......... *H04L 63/1483* (2013.01); *G06N 20/00* (2019.01); *G06Q 10/10* (2013.01); *H04L 63/0227* (2013.01); *H04L 63/168* (2013.01)

(58) Field of Classification Search
CPC ............. H04L 63/1483; H04L 63/0227; H04L 63/168; G06N 20/00; G06Q 10/10
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| | (Continued) | |

FOREIGN PATENT DOCUMENTS

| | | |
|---|---|---|
| CN | 105763543 A | 7/2016 |
| GB | 2439806 A | 1/2008 |
| | (Continued) | |

OTHER PUBLICATIONS

Kazemian et al, Comparisons of machine learning techniques for detecting malicious webpages, 2014. (Year: 2014).*

(Continued)

*Primary Examiner* — Trong H Nguyen
(74) *Attorney, Agent, or Firm* — Rutan & Tucker, LLP

(57) ABSTRACT

A computerized method for analyzing a subject URL to determine whether the subject URL is associated with a phishing attack is disclosed. The method includes steps of detecting keypoints within a screenshot of a webpage corresponding to the subject URL and determining a set of confidences based on an analysis of the detected keypoints with a model. Each confidence within the set of confidences is assigned to feature vector within a set of training feature vectors representing a training set of URLs used in generating the model. The method comprises performing an image comparison between the screenshot and a screenshot corresponding to a feature vector within the set of training feature vectors, the feature vector being assigned a highest confidence. Responsive to determining the image comparison result exceeds a predefined threshold, transmitting an alert indicating that the subject URL is associated with the phishing attack.

32 Claims, 5 Drawing Sheets

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,175,387 B1 | 5/2012 | Hsieh et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |

(56) References Cited

U.S. PATENT DOCUMENTS

| | | |
|---|---|---|
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Dtvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |

(56) References Cited

U.S. PATENT DOCUMENTS

| | | |
|---|---|---|
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B2 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Shame et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |

(56) References Cited

U.S. PATENT DOCUMENTS

| | | |
|---|---|---|
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0162449 A1* | 7/2008 | Chao-Yu ............ G06F 21/51 |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0006361 A1* | 1/2009 | Abuelsaad ........ G06F 16/9535 |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117239 A1* | 5/2012 | Holloway .......... H04L 61/1511 709/226 |
| 2012/0117652 A1 | 5/2012 | Manni et al. |
| 2012/0121154 A1 | 5/2012 | Xue et al. |

(56) References Cited

U.S. PATENT DOCUMENTS

| | | |
|---|---|---|
| 2012/0124426 A1 | 5/2012 | Maybee et al. |
| 2012/0158626 A1* | 6/2012 | Zhu .................. G06F 21/56 706/13 |
| 2012/0159620 A1* | 6/2012 | Seifert ............... H04L 63/1416 726/22 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gable et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097700 A1 | 4/2013 | Chen et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | Lemasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shifter et al. |
| 2013/0325792 A1 | 12/2013 | Shifter et al. |
| 2013/0325871 A1 | 12/2013 | Shifter et al. |
| 2013/0325872 A1 | 12/2013 | Shifter et al. |
| 2014/0032875 A1 | 1/2014 | Butler |
| 2014/0033307 A1* | 1/2014 | Schmidtler ......... H04L 63/1483 726/22 |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0033341 A1 | 1/2015 | Schmidtler et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0352772 A1 | 12/2016 | O'Connor |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0115584 A1* | 4/2018 | Alhumaisan ........ H04L 63/1483 |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| GB | 2490431 A | 10/2012 |
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |
| WO | 2014/208937 A1 | 12/2014 |

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

(56) References Cited

OTHER PUBLICATIONS

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—an advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", Infocom, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "Sandboxii: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", in Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
Haruta Shuichiro et al: "Visual Similarity-Based Phishing Detection Scheme Using Image and CSS With Target Website Finder." Globecom 2017—2017 Ieee Global Communications Conference, Ieee, Dec. 4, 2017.
Kazemian H B et al: "Comparisons of Machine Learning Techniques for Detecting Malicious Webpages", Expert Systems With Applications, Oxford, Gb, vol. 42. No. 3, Sep. 16, 2014.
Max-Emanuel Maurer et al: "Using Visual Website Similarity for Phishing Detection and Reporting". Proceedings of the 2012 Acm Annual Conference Extended Abstracts on Human Factors in Computing Systems Extended Abstracts, Chi Ea '12, May 5, 2012.
PCT/US2018/053561 filed Sep. 28, 2018 International Search Report and Written Opinion dated Jan. 18, 2019.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.

(56) References Cited

OTHER PUBLICATIONS

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

Afroz, S. et al. "PhishZoo: Detecting Phishing Websites by Looking at Them", 2011 IEEE Fifth International Conference on Semantic Computing. DOI: 10.1109/ICSC.2011.52. Sep. 2011.

\* cited by examiner

PHISHING ATTACK DETECTION

FIELD

Embodiments of the disclosure relate to the field of cybersecurity. More specifically, embodiments of the disclosure relate to a system and method for detecting phishing attacks.

GENERAL BACKGROUND

Phishing is a growing problem on the internet. Phishing is the attempt to obtain sensitive information from targets by disguising requests as legitimate. A phishing attack can entail the transmission of an electronic communication, such as an email, to one or more recipients that purports to be from a known institution, such as a bank or credit card company, and seems to have a legitimate intention; however, the email is actually intended to deceive the recipient into sharing its sensitive information. Often the email draws the recipient to a counterfeit version of the institution's webpage designed to elicit the sensitive information, such as the recipient's username, password, etc.

For example, a malware author may transmit an email to a recipient purporting to be from a financial institution and asserting that a password change is required to maintain access to the recipient's account. The email includes a Uniform Resource Locator (URL) that directs the recipient to a counterfeit version of the institution's website requesting the recipient to enter sensitive information in a displayed form in order to change the recipient's password. Neither the email nor the URL are associated with the actual financial institution or its genuine website, although the entail and the counterfeit website may have an official "look and feel" and imitate a genuine email and website of the institution. The phishing attack is completed when the recipient of the email enters and submits sensitive information to the website, which is then delivered to the malware author.

Current solutions for phishing detection include textual search and analysis of entails and a displayed webpage. However, such solutions have a plurality of drawbacks and too often fail to detect phishing attacks. As a first drawback, current textual search-based phishing detection systems may be unable to determine whether a website to which a URL resolves is a phishing website due to an insufficient amount of text displayed on the website. Specifically, when a website contains insufficient text, a textual search analysis may not have enough data to allow an accurate analysis. As a second drawback, current textual search-based current solutions may be unable to perform an analysis on the website to which the URL resolves due to the text of the website being contained within one or more images (e.g., bitmaps, jpegs, etc.), which cannot be processed using a textual search-based analysis. As yet another drawback, current textual search-based solutions may be unable to perform the necessary textual search and analysis in many languages due to an insufficient corpus of data; thus, providing a lackluster solution with respect to the global nature of attacks on businesses today (e.g., the large number of characters in Asian languages makes a textual search-based analysis difficult). Thus, a new phishing detection technique is needed to more efficiently, efficaciously, and reliably detect phishing cybersecurity attacks ("cyberattacks") of this type.

DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

I. Overview Summary

Figure 1:
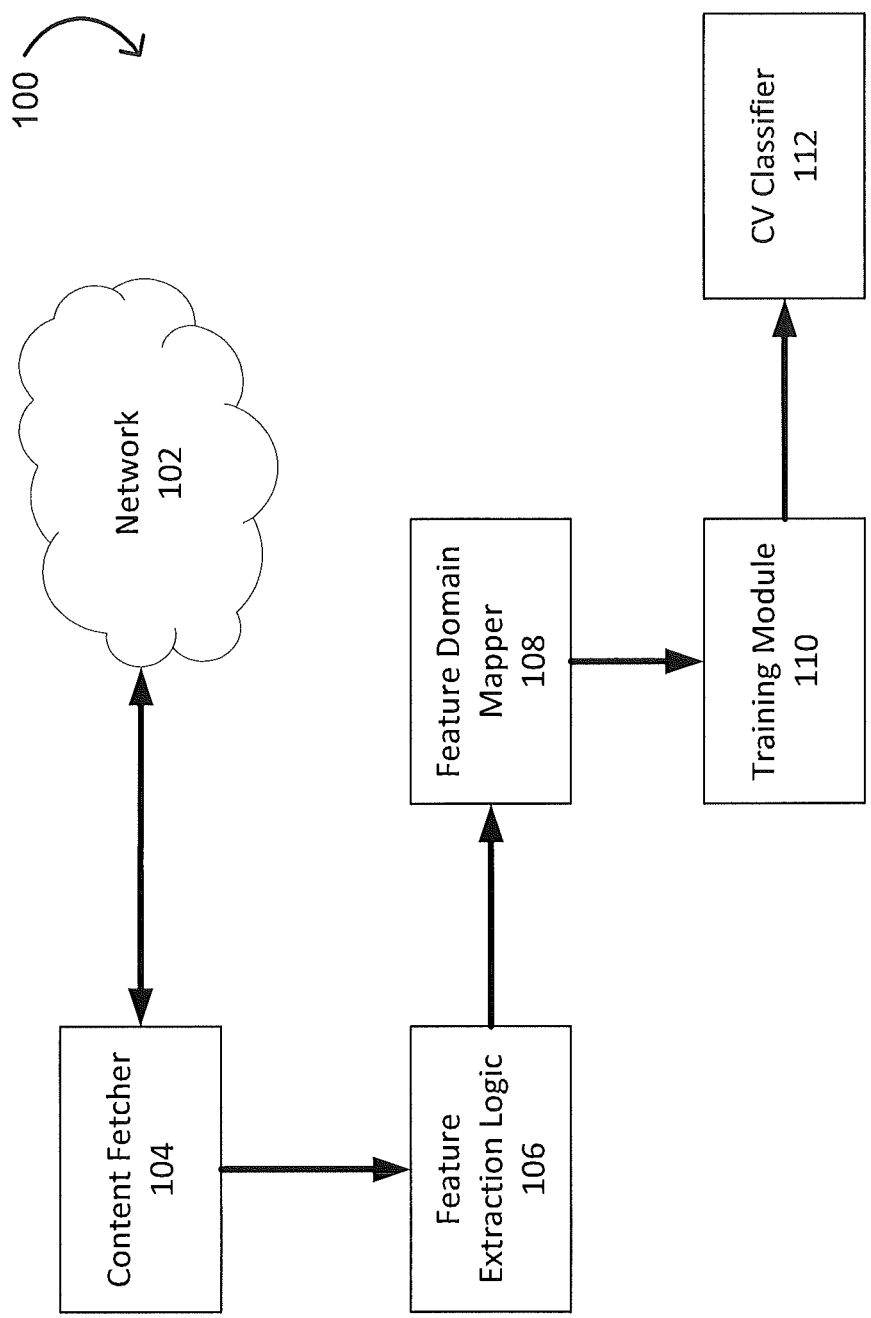
FIG. 1 is an exemplary block diagram of a logic flow during performance of a training process by a phishing detection and analysis system (PDAS) according to an embodiment of the invention.

Embodiments of systems and methods for detecting phishing attacks are described. The phishing, detection and analysis system (PDAS) is configured to detect a phishing attack through the use of computer vision techniques that leverage a graphic representation (i.e., the representation expressing the "look and feel") of a webpage to determine whether the webpage is attempting to mimic a legitimate webpage. Some specific embodiments attempt to determine whether a webpage is attempting to mimic a webpage through which a user enters sensitive information, such as login credentials, for purposes of stealing such sensitive information.

As a general overview, the PDAS described herein includes (i) a training process and (ii) a detection process. The training process generates a machine learning model ("model"), the model including a set of correlation rules, that is used in the detection process. The detection process receives a URL and analyzes the URL based on the model to make a determination as to whether the URL is part of a phishing cyberattack.

The training process involves the generation of a model using machine learning techniques, the model representing a categorization of a training set of URLs into one or more webpage families, the training set of URLs known to be associated with genuine (non-phishing) websites (in some embodiments, known phishing URLs may be provided to improve the model). The training process includes retrieval of a screenshot associated with each URL of the training set of URLs, processing of each screenshot to (i) detect a set of keypoints and (ii) generate feature vectors corresponding to the detected set of keypoints. A feature may be interpreted as a keypoint and corresponding keypoint descriptors, e.g., parameters of the keypoint enabling identification of the keypoint and its location within a screenshot. After generation of the feature vectors, the feature vectors are labeled based on a known webpage family and the model is generated, the model being a digitized representation of the correlation or the feature vectors corresponding to the URLs within the training set of URLs. In some embodiments, the webpage families may represent a set of URL domains.

The model is generated for use in a detection process, discussed below, to identify the keypoints within a feature vector corresponding to at least one of the URLs within the training set to which a screenshot under analysis most closely correlates. A URL under analysis, a webpage under analysis or a screenshot under analysis may be referred to as a subject URL, a subject webpage and a subject screenshot, respectively. More specifically, the analysis of a subject screenshot using the model results in a set of confidences, each confidence corresponding to a feature vector corresponding to a URL within the training set. The highest confidence indicating the highest correlation between the subject screenshot and the feature vector corresponding to a URL within the training set. The correlation is based on the generated feature vectors of (i) the subject screenshot, and (ii) the screenshot(s) corresponding to the URLs within the training set.

A webpage family refers to a set of webpages associated with a particular company or other organization that shares a webpage design system reflecting the branding and design elements (including logos, layout and visual landscape (e.g., color, contrast, etc.)) of the organization to provide site visitors with a consistent and recognizable visual experience. The webpage family may include one or more webpage members, though generally it will include plural webpages for each family of most interest in the practice of the invention, i.e., those generally used in phishing attacks. The members of the webpage family may and generally will differ from one another, for example in message content (such as textual content, user-interactive elements, and pictorial elements) and even graphical elements; hence, they will generally exhibit variations called "variances" across the family. Often the webpage family may share a domain name and/or other URL components, but that is not the necessary and sufficient determinant of membership in the family since similar domain names and other URL components may mislead visitors as to the "owner" of the website. However, domain name sharing may be used as one aspect in determining family membership. Accordingly, the invention may use computer vision to determine family membership.

It should be noted that any variances will be such that webpages within a webpage family have a consistent layout and visual landscape. As discussed below, webpages belonging to a particular owner (e.g., a single company sharing a domain name) may differ in some aspects of the layout and visual landscape (e.g., differ in number of input types and/or input forms, for example, textboxes in a first webpage and radio dials in a second webpage). In such an embodiment, the webpages may be divided into two webpage families based on detected keypoints with both webpage families being linked to the single owner for the detection process.

In particular, during the training process, for each screenshot corresponding to a URL within the training set of URLs, a set of keypoints is detected. Each keypoint detected within the screenshot identifies a "point of interest." Points of interest reflect regions of an image which are observable. A "keypoint" may be defined as an image region, e.g., a set of pixels, within the screenshot (e.g., any shaped-region such as a circular-shaped region). Known keypoint detection techniques such as rule sets that detect keypoints based on pixel density. Scale-Invariant Feature Transform (SIFT), Features from Accelerated Segment Test (FAST) and/or Binary Robust Invariant Scale Keypoints (BRISK) may be utilized to detect keypoints.

Subsequently, keypoint descriptors corresponding to the detected keypoints are determined. A keypoint descriptor may include a set of one or more parameters that describe the keypoint such as keypoint center coordinates x and y relative to the screenshot, a scale (e.g., being a radius of a circular image region, when applicable), and/or an orientation determined by the gradient of the pixel greyscale within the keypoint. The parameters enable the generated model to be invariant to orientation or scale differences in the subject screenshot. Each keypoint descriptor provides the ability to reliably identify a keypoint within a sereenshot. The keypoints and/or keypoint descriptors of the processed screenshot may be stored in a data store (e.g. a database).

More specifically, the training process begins upon receipt of a list of labeled URLs. The list of URLs resolves to webpages that are generally known to be typically targeted for use in phishing attacks such as login webpages of banks or other online accounts of well-known companies such as Apple iTunes®, Spotify®, Netflix®, etc. The list of URLs (wherein the set of URLs is referred to as the "training set") may be obtained or updated periodically or aperiodically for training of the PDAS classifier logic so as to reflect commonly visited websites. The PDAS may obtain a plurality of screenshots corresponding to a webpage associated with a URL, each such screenshot corresponding to a browser/operating system combination. A screenshot of the webpage to which each URL resolves is obtained by the PDAS, which then utilizes computer vision techniques to detect keypoints, determine keypoint descriptors and generate a feature vector for each screenshot. A feature may be interpreted as a set of keypoints and their corresponding keypoint descriptors that indicate a point of interest within the screenshot (e.g., a logo or a portion thereof). A feature vector includes the plurality of features detected within a screenshot. In some embodiments, methods other than a vector may be used to store and organize the features, such as a matrix or other data structure within memory. As an example, the features may be distinctive aspects of a webpage that enable the PDAS, during the detection process, to determine whether a subject webpage is attempting to mimic a webpage included in the training set. The features of each screenshot are inserted into separate vectors and labeled according to the webpage family to which the URL corresponding to the feature vector belongs. The plurality of labeled feature vectors are then used by the PDAS to generate a model using machine learning. As mentioned above, the model is a digitized representation of the correlation of the feature vectors corresponding to the URLs within the training set of URLs. More specifically, the model may be a collection of keypoints corresponding to the training set described as a function implemented programmatically in code where the function is tuned using the training set and keypoints selected (digital sampling) by machine learning techniques. Once the function is generated and tuned, it can be applied to other (unknown) image keypoint sets during the detection process to analyze a subject screenshot. One example of the model may be a hyperplane.

During the machine learning in generating the model, the training typically involves a plurality of webpages from the same webpage family and the system is trained to recognize family membership through identifying keypoints shared (high correlation) across those "labeled" webpages. The detection of those keypoints, including their location within the corresponding webpage, is key to later classification of an "unlabeled" webpage as being a member of the family to which it purports to be a member (through visual similarity). After all, a webpage can have a large number of keypoints (e.g., hundreds or thousands for example), and the training, in some embodiments, may go to selection of the keypoints that together are unique to the corresponding screenshot and can be used for training analysis to accurately identify members of the labeled webpage families and later, after training, with respect to the unlabeled webpages. Moreover, the keypoints can be selected so as to capture the common branding, and design elements of a webpage family rather than variances across the members of the family so that membership in the family can be accurately determined with minimal or no false positives or false negatives.

In some embodiments, the generation of the model involves detecting keypoints within each screenshot corresponding to the URLs within the training set. The detected keypoints are then used to extract features within each screenshot and generate a feature vector for each screenshot. The detection of keypoints and generation of feature vectors are performed using computer vision techniques such as those mentioned above. Each feature vector within the set of feature vectors is labeled according to a webpage family to which it belongs and the set of feature vectors are then used to generate the model using machine learning techniques. The machine learning techniques may include, but are not limited or restricted to, the generation of (i) support vector machines (SVMs), (ii) distribution functions such as a naïve bayes classifier, (iii) a K-nearest neighbor pattern detection algorithm, and/or (iv) a decision tree.

Machine learning techniques rely on a machine learning model, which is executable by a processor to implement a computerized approach to learning from and making predictions based on data sets. These include stored known (labelled) data sets used to train (or tune) the machine learning model in reaching conclusions regarding the data sets, e.g., classify and verify the classification by comparison with the labels. The data sets also include one or more unknown (unlabeled) data sets, for which the machine learning model is to reach conclusions (classify) by applying its acquired "learning" with, if trained properly, a high degree of confidence.

In recent years, machine learning technology has seen development and application diverse fields (such as computer vision) of a great many widely-used, executable machine learning computer programs. These implement any of a variety of different machine learning techniques commonly referred to as machine learning functions or algorithms. For purposes of this invention, the details of the machine learning functions and their implementation in machine learning software programs need not be described here though those of skill in the art would be readily able to choose from many commercially or publicly available ("open source") alternatives to implement this invention, as mentioned above.

Herein, machine learning is used to recognize membership and non-membership in a family of webpages as a strong indication of phishing attacks. More specifically the machine learning model represents the correlation of the feature vectors corresponding to the screenshots based on data sets associated with the screenshots. It can be understood that each data set is a collection of images information, which can be computationally processed pursuant to or by a machine learning function implemented programmatically. The machine learning function operates on keypoints expressed as keypoint descriptors and is generated or tuned using the training set to both select (digital sample) keypoints and use their descriptors, formed into feature vectors, in classifying the webpage images. The machine learning function itself is generated and tuned during the training phase to classify the data sets, and then is stored in association with the stored representation of the screenshot images in memory for later use. Once the function is generated and tuned, it can be applied to other (unknown) image data sets for their classification.

The detection process involves receipt of a URL for analysis to determine whether the URL is associated with a phishing cyberattack ("subject URL"). The detection process involves retrieval of a subject screenshot corresponding to the subject URL and detection of the keypoints of the subject screenshot. Keypoint descriptors are then generated that correspond to the detected keypoints. The detection process includes an analysis of the generated keypoint descriptors based on the model generated during the training process to determine a correlation between (i) the keypoints corresponding to the subject URL and (ii) keypoints corresponding to the URLs within the training set that have been categorized into webpage families. One or more screenshots corresponding to the webpage family being the most highly correlated to the keypoints of the subject screenshot is selected. In some embodiments there may be a plurality of webpage families closely correlated with the keypoints of the subject screenshot; the remainder of the system would be processed relative to that plurality. The keypoints of the subject screenshot are compared, via known image comparison techniques in the field of computer vision, to the keypoints of the selected screenshot. In some embodiments, a plurality of screenshots may be associated with a single webpage family as mentioned above, in which case an image comparison would be performed between the subject screenshot and each screenshot of the plurality of screenshots corresponding to the most highly correlated webpage family. If this image comparison exceeds a threshold, the subject URL is determined to be associated with a phishing cyberattack. Upon determination of the subject URL being associated with a phishing cyberattack, an alert and/or a report is issued to an administrator or a cybersecurity analyst.

More particularly, the detection process includes the (i) generation of a subject screenshot of a webpage retrieved from a subject URL, (ii) processing the subject screenshot to identify a set of keypoints, (iii) correlating the set of keypoints to a set of known benign or known phishing pages using the model, and (iv) if the correlation exceeds a threshold, classifying the subject URL as part of a phishing cyberattack. In some embodiments, the retrieval of the subject screenshot, or content associated therewith, may be via a centrally located system using an internet browser as discussed below or via accessing a data caching system that has stored therein previously captured screenshots. In some embodiments, the PDAS performs a pre-filtering process, which may include static scanning of the subject URL (e.g., blacklist or white list analysis, namely heuristics, exploit signature checks and/or vulnerability signature checks for example). If the subject URL is not determined to be either malicious (i.e. related to a phishing attack) or benign based on the static scanning, a subject screenshot of the subject webpage to which the subject URL resolves is obtained by the PDAS.

The screenshot may result from the processing of the webpage (the webpage associated with the URL) based on the characteristics (e.g. selected internet browser applications, operating systems, etc.). A logic module of the PDAS utilizes computer vision techniques to detect keypoints within the subject screenshot and generates a feature vector based on the detected keypoints in the same manner as discussed above with respect to the training process. The feature vector of the subject screenshot is analyzed using the model to determine a set of confidences, with each confidence corresponding to a separate labeled feature vector corresponding to the training set; thus, providing an understanding of the webpage family having the highest confidence (e.g., which webpage family, and specifically, which webpage, is most likely being mimicked by the subject screenshot). For example, a first confidence corresponds to the likelihood a screenshot within a first webpage family is being mimicked and a $n^{th}$ confidence corresponds to the likelihood a screenshot within a $n^{th}$ webpage family is being mimicked. A screenshot of at least a first webpage of the webpage family having the highest confidence is then used in an image comparison operation with the subject screenshot. The image comparison may include a comparison of detected keypoints of the subject screenshot and the webpage(s) of the webpage family having the highest confidence. When the image comparison results in a match above a predefined threshold, the PDAS determines that the subject webpage and the subject URL are part of a phishing attack.

Specifically, in contrast to alternative phishing detection systems that may merely perform image comparisons—e.g., comparisons of detected keypoints in a brute force manner between a webpage under analysis and hundreds or thousands of webpage screenshots—the disclosure provides novel systems and methods that enable a detection process involving computer vision techniques to avoid performing image comparisons between a subject webpage and hundreds or thousands or webpage screenshots while providing a determination that limits false positives and false negatives through the use of a model trained using the detected keypoints of hundreds or thousands of webpage screenshots prior to the detection process. Specifically, a brute force image comparison of hundreds or thousands of webpage screenshots within a training set to the subject webpage is avoided by generating a model that represents the detected keypoints of each of the webpages within the training set and utilizing the model to obtain a set of confidences, each confidence indicating the likelihood a webpage of a webpage family is being mimicked by the subject webpage.

To achieve higher efficiencies during analysis compared to alternative systems, the systems and methods described below only conduct an image comparison with respect to the webpage(s) corresponding to the webpage family having the highest confidence of visual similarity to the subject screenshot. Thus, an image comparison of (i) the subject screenshot and (ii) the webpage(s) corresponding to the webpage family having the highest confidence is more efficient with time and resources than a brute force method of performing image comparisons between the subject screenshot and hundreds or thousands of screenshots. Thus, with respect to the detection process, by performing the feature generation and classification processes discussed in detail below prior to the image comparison, the disclosure provides systems and methods for detecting phishing URLs and webpages that efficiently use resources and save processing time previously needed to perform such a determination.

II. Terminology

In the following description, certain terminology is used to describe various features of the invention. For example, each of the tents "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "computerized" generally represents that any corresponding operations are conducted by hardware in combination with software and/or firmware.

According to one embodiment of the disclosure, the term "malware" may be broadly construed as any code, communication or activity that initiates or furthers a cyberattack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

A "characteristic" includes data associated with an object under analysis that may be collected without execution of the object such as metadata associated with the object (e.g., size, name, path, grey scale, etc.) or content of the object (e.g., portions of code) without execution of the selected object.

The term "object" generally relates to content (or a reference to access such content) having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. In one embodiment, an object may be a URL or list of URLs. The object may be retrieved from information in transit (e.g., one or more packets, one or more flows each being a plurality of related packets, etc.) or information at rest (e.g., data bytes from a storage medium).

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint device (e.g., a laptop, a mobile phone, a tablet, a computer, etc.), a standalone appliance, a server, a router or other intermediary communication device, a firewall, etc.

The term "transmission medium" may be construed as a physical or logical communication path between two or more network devices or, between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device.

Finally, the terms "or" and "and/or" as used herein are to be interpreted as inclusive or meaning any one or any combination. Therefore, "A, B or C" or "A, B and/or C" mean "any of the following: A; B; C; A and B: A and C; B and C; B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Figure 4:
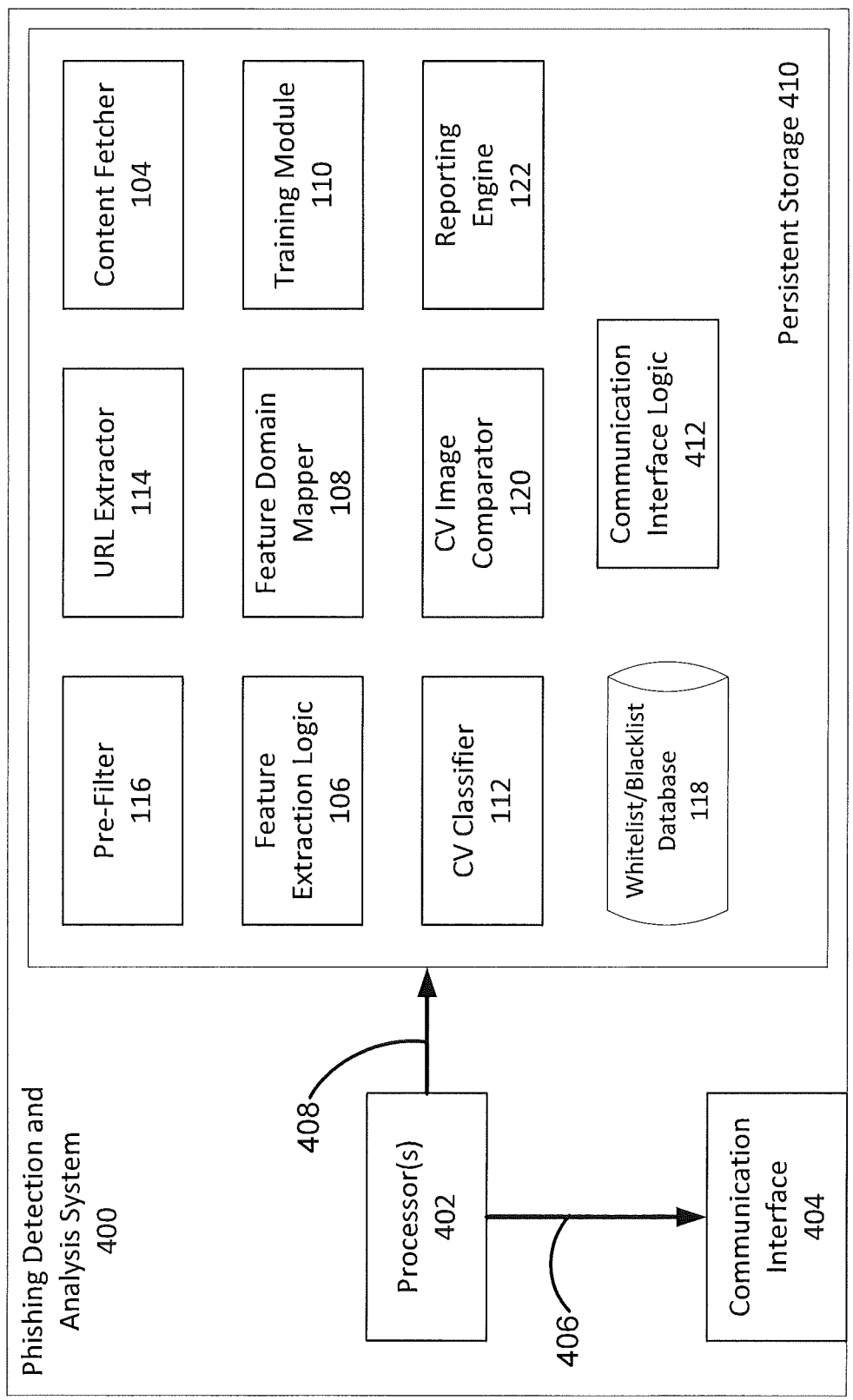
FIG. 4 is an exemplary embodiment of a logical representation of the phishing detection and analysis system of FIG. 1.

Referring to FIG. 1, an exemplary block diagram of a logic flow during performance of a training process by a phishing detection and analysis system (PDAS) according to an embodiment of the invention is shown. The logic flow 100 of the training process illustrates the flow of data among logic modules of the PDAS 400, as seen in FIG. 4, in order to train a classifier 112 (e.g., CV classifier) for use in detecting URLs that resolve to phishing websites.

As an overview the training process involves receipt of a list of URLs for use the detection of phishing websites. The list of URLs may be based on internal analytics, a third-party source, or the like. The URLs included in the list of URLs may be either known, benign websites (e.g., those that are often used in carrying out phishing attacks) and/or known phishing websites. The screenshot of the website of each URL of the list of URLs is obtained by the content fetcher 104, and the feature generation logic 106 utilizes computer vision techniques to generate keypoint descriptors, also referred to as "features" as mentioned above, based on each screenshot, as discussed below. The features of each screenshot are inserted into separate vectors ("feature vectors"). The feature domain mapper 108 receives the feature vectors and labels each vector according to the website family of the screenshot to which the feature vector corresponds. The plurality of labeled feature vectors are then provided to the training module 110, which uses the plurality of feature vectors to generate a model that categorizes the plurality of labeled feature vectors. In one embodiment, the model represents a plurality of hyperplanes onto which the features of each vector may be categorized. The model is then provided to the classifier 112 for use in the detection process, as discussed with respect to at least FIG. 2.

More specifically, the training process of FIG. 1 begins with the content fetcher 104 receiving a list of URLs from a source. The source may include, but is not limited or restricted to a third-party website, an administrator and/or a cybersecurity analyst (hereinafter referred to as "an analyst"). Specifically, the list of URLs provided to the content fetcher 104 may be used to fetch data used in training the classifier 112. As one non-limiting example, a detection process may be focused on detecting phishing websites attempting to mimic banking websites, which are often used in phishing, attacks. However, the disclosure should not be limited to banking websites, instead, any website may be used by the PDAS 400. For purposes of clarity the examples discussed herein will involve banking websites.

Upon receiving the list of URLs, the content fetcher 104 obtains a screenshot of the website to which each URL provided resolves. The content fetcher 104 obtains a screenshot by utilization of an internet browser to access a URL to render the webpage to which the URL resolves and, after waiting a specified timeout period during which the webpage rendering is completed, a screen shot is captured and saved as an object (e.g., an image file such as a JPEG). Alternatively, as discussed above, the content fetcher 104 may obtain the screenshot via data caching system in a situation when the screenshot has been previously obtained and stored therein.

Upon obtaining a screenshot of the website to which each URL resolves, one or more screenshots may be provided to the feature generation logic 106. It should be noted that the content fetcher 104 may provide the one or more screenshots (or identifiers thereof, such as file names) to the feature generation logic 106 as other screenshots from the list of URLs are being collected, as opposed to obtaining the screenshots prior to passing the screenshots along to the feature generation logic 106. For each screenshot, the feature generation logic 106 is responsible for: (1) detecting keypoints within the screenshot, (2) generating keypoint descriptors based on the detected keypoints, and (3) generating a feature vector that includes the generated keypoint descriptors. The feature generation logic 106 uses computer vision techniques to detect the keypoints. According to one embodiment of the disclosure, the computer vision techniques may include detection of groupings of pixels wherein a grouping of pixels includes predetermined characteristics such as specified changes in grey scale. The feature generation logic 106 may utilize the computer vision techniques to detect edges and corners in images in the screenshot or more generally to perform density location operations, which detect groupings of pixels within the screenshot that include a high density of pixels (e.g., non-white space). The feature generation logic 106 may detect keypoints of the screenshots, the keypoints related to one another based on geometric measurements (e.g. distance between sets of keypoints, angle of intersection between sets of keypoints, etc.). Specific examples of the keypoint detection procedure will be well known to those skilled in the art. Additionally, various computer vision techniques may be utilized to detect keypoints. One example of a computer vision technique that may be utilized includes blob detection based on one or more matrices, e.g., the Hessian matrix, to determine change in the greyscale of pixels and generation of keypoints that exceed a predefined threshold of change according to a calculated determinant of one or more of the matrices. The term "blob" may refer to a region of pixels. Further, in one embodiment, a computer vision technique may be used to detect keypoints, which may then be generated and placed in a feature vector as discussed herein, such that the edge, corner and/or blob detection is dependent on detection of properties of a screenshot such as brightness, color, or greyscale compared to surrounding regions.

Upon detecting a plurality of keypoints within a screenshot, the feature generation logic 106 determines a keypoint descriptor for each keypoint. A keypoint descriptor may be generated by extracting a predefined-sized block of pixels including the keypoint, dividing the block of pixels into sub-blocks, and taking into account a plurality of possible orientations of the pixels and storing such information (a keypoint descriptor may be referred to herein as a feature). In one embodiment, a vector ("a feature vector") may then be created for each screenshot, the feature vector storing the plurality of keypoint descriptors for a particular screenshot.

The set of feature vectors for the screenshots are then provided to the feature domain mapper 108 by the feature generation logic 106. With respect to a first feature vector, the feature domain mapper 108 labels the first feature vector according to the webpage family of the webpage to which the URL resolves to which the generated features correspond. As a non-limiting example, a feature vector is generated for a URL that resolves to a Bank of America webpage (e.g., a log-in webpage). The feature vector (containing the generated features of the Bank of America webpage) is then labeled as "Bank of America." Herein, labeling may correspond to appending to or otherwise associating an identifier with a feature vector. The feature domain mapper 108 performs the labeling process for each feature vector, wherein, in one embodiment, the webpage family may be provided along with the screenshot from the content fetcher 104 and further passed along with the feature vector from the feature generation logic 106.

The plurality of labeled feature vectors are provided to the training module 110, which generates a model, based on the plurality of feature vectors, to associate feature vectors based on labeling. The association of feature vectors may be based on a correlation of the plurality of feature vectors above a predefined (or variable) threshold. As mentioned above, in one embodiment, the model may represent modeling of a plurality of hyperplanes into which the features of each vector may be categorized. In such an embodiment, each URL may be representative of a webpage family with each webpage family having its own hyperplane. Each of the plurality of hyperplanes may be generated by the training module 110, based on the key point descriptors discussed above, as well as the keypoints themselves (i.e., keypoint center coordinates randy, a scale of the keypoint and an orientation of the keypoint). Additionally, in such an embodiment, the training module 110 may then generate a model that represents the plurality of hyperplanes. The model is then provided to the classifier 112 for use in the detection process, as discussed with respect to at least FIG. 2. In alternative embodiments, the model may be generated to represent the categorization of the plurality of feature vectors in other forms, such as in a model representing a histogram, wherein each bin of the histogram includes the feature vector corresponding to a webpage within the training set.

Figure 2:
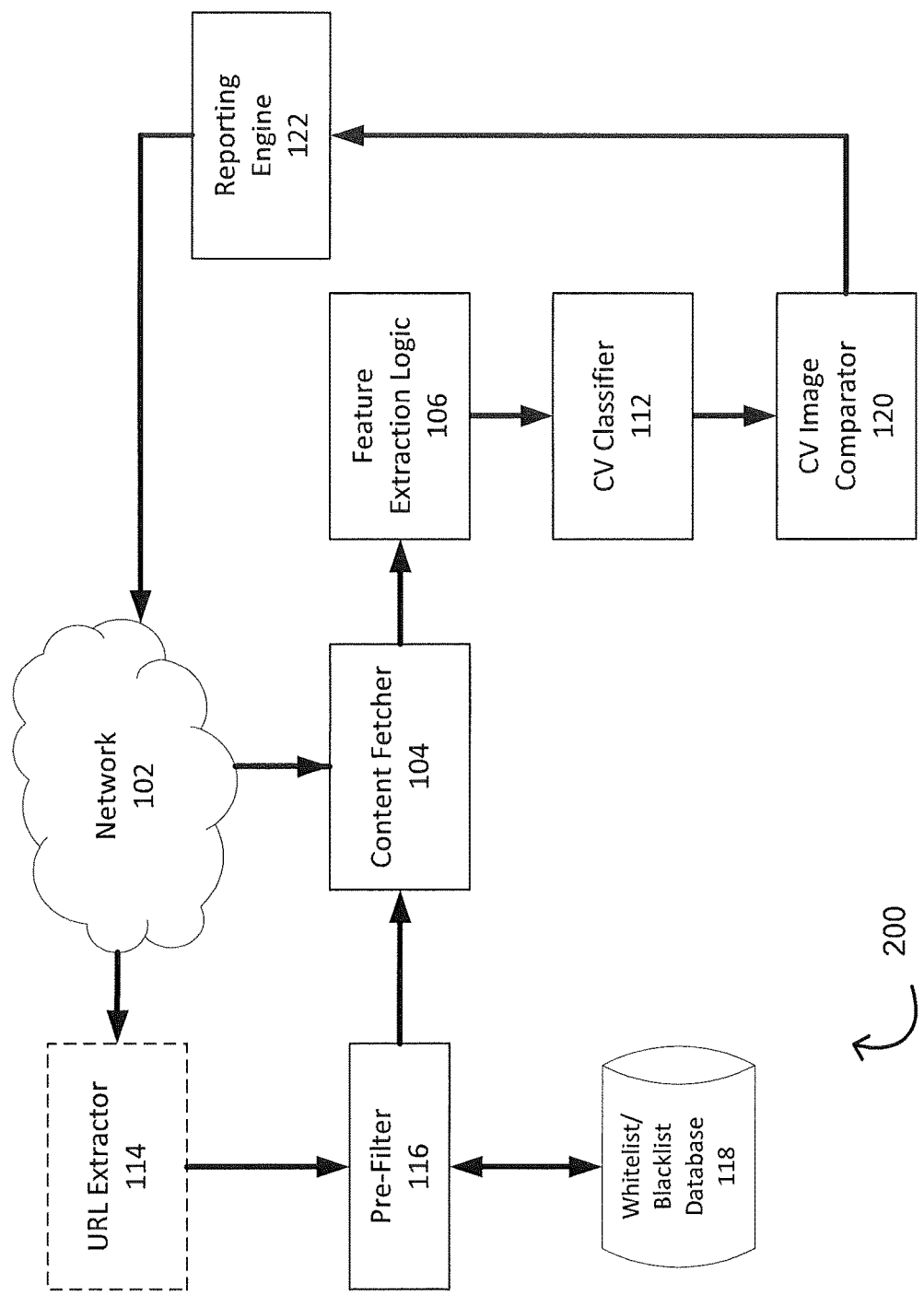
FIG. 2 is an exemplary block diagram of a logic flow during performance of a detection process by a phishing detection and analysis system (PDAS) according to an embodiment of the invention.

Referring now to FIG. 2, an exemplary block diagram of a logic flow during performance of a detection process by a PDAS according to an embodiment of the invention is shown. The logic flow 200 of the detection process illustrates the flow of data among logic modules of the PDAS 400, as seen in FIG. 4, in detecting URLs that resolve to phishing websites.

As a general overview, the detection process begins when the PDAS 400 receives a subject URL. In one embodiment, the pre-filter 116 is provided the subject URL and performs a pre-filtering step, discussed below. However, according to another embodiment, the PDAS 400 may receive an object and, in such an embodiment, an optional URL extractor 114 may first extract the subject URL (e.g., from an email or other object) and provide the extracted subject URL to the pre-filter 116 for pre-filtering. The pre-filter 116 performs a pre-filtering process, such as one or more static scans, on the URL, which may include performing whitelist/blacklist comparisons. When the subject URL is not found to be either malicious or benign, the subject URL is provided to the content fetcher 104, which obtains, in some embodiments, generates, a screenshot of the webpage to which the URL resolves, as discussed above.

The content fetcher 104 retrieves from the URL then provides the subject screenshot of the contents of the subject webpage (e.g., an image file, or an identifier, enabling retrieval of the image file), rendered by an interne browser, to the feature generation logic 106. As discussed above, the feature generation logic 106 detects keypoints within the subject screenshot and generates a feature vector based on the detected keypoints. The feature vector corresponding to the subject screenshot is provided to the classifier 112 for webpage family classification based on the model generated by the training module. As discussed above with respect to FIG. 1, each webpage family may correspond to a URL domain (e.g., each webpage family may correspond to a domain of a bank website such that the webpage families may be, for example, Bank of America, Wells Fargo, First Republic, etc.). A confidence may be determined for webpage family based on an analysis of the detected keypoint descriptors of the subject screenshot in accordance with the model. The confidence determined for a webpage family indicates the likelihood that the subject screenshot is attempting to mimic the webpage corresponding to the webpage family.

The webpage family having the highest confidence may be passed to an image comparator 120 (e.g., CV image comparator) which performs an image comparison between the subject screenshot and the webpage corresponding to the webpage family with the highest confidence. In some embodiments, one or more webpage families having the highest confidences are passed to the image comparator 120, which performs the image comparison for screenshots of webpages corresponding to the one or more webpage families. During training, a feature vector is determined for each webpage family and each feature vector is utilized in generating the model. The model provides confidences for each feature vector corresponding to URLs within the training; thus, the set of confidences provide an indication as to both the webpage family corresponding to the highest confidence and the feature vector, corresponding to a particular screenshot, having highest confidence. In a second embodiment, a webpage within a webpage family may be predefined as the webpage within a webpage family to be used in an image comparison when the webpage family is determined to have the highest confidence. In another embodiment, two or more (or all) webpages within a webpage family may be indicated as having the highest correlation and/or two or more (or all) webpages within the webpage family may be predefined as those to be used in an image comparison.

When the image comparison results in a match (e.g., correlation value) above a predefined threshold, the PDAS 400 determines that the subject webpage and the subject URL itself are part of a phishing attack. Where two or more webpages within a webpage family are used, the comparison with the subject webpage may be made separately for each of the webpages and, in alternatively embodiments (i) if any or a prescribed number of the resulting correlation values exceed the threshold, the URL is declared part of a phishing attack, or (ii) if the correlation value determined by statistically combining the separate correlation values (e.g., as by determining the mean, median, or mode of the separate correlation values) exceeds the threshold, the URL is declared part of a phishing attack.

In contrast to performing image comparisons on a large body of screenshots, the above-described detection process involving computer vision techniques analyzes only a relevant (based on a level of confidence) subset of screenshots associated with the subject screenshot.

More specifically, the detection process of FIG. 2 begins when the PDAS 400 receives a URL. As discussed above, the PDAS 400 may receive an object and, in such an embodiment, an optional URL extractor 114 may first extract the URL from the object and provide the extracted URL to the pre-filter 116 for pre-filtering. In another embodiment, the PDAS 400 may be provided with a URL, which may be passed directly to the pre-filter 116.

The pre-filter 116 performs a pre-filtering process on the URL, which may include one or more static scans such as whitelist/blacklist comparisons. In particular, the whitelist/blacklist database 118 stores data corresponding to whitelisted URLs (indicators determined to be benign) as well as blacklisted URLs (indicators determined to be associated with cyberattacks, e.g., phishing attacks). Comparisons performed by the pre-filter 116 between the whitelisted and blacklisted URLs stored in the whitelist/blacklist database 118 seek to remove any URLs known to be either benign or malicious. As a result of removing known benign or malicious URLs from the analysis, URLs passed on by the pre-filter 116 as not being knowingly benign or malicious and that resolve to webpages that very closely resemble known benign webpages (e.g., those of Bank of America, Wells Fargo, etc.) or malicious (e.g., known phishing webpages) are determined to be phishing webpages. Specifically, known benign URLs may be removed from the detection analysis by the pre-filter 116 (e.g., legitimate URLs of Bank of America, Wells Fargo, etc.) thus, URLs that are not removed by the pre-filter 116 and resolve to a webpage that very closely resembles the "look and feel" (graphic representation) of a benign webpage may be determined to be a phishing URL.

When the URL is not found to be either malicious or benign URL is not present in the blacklist or whitelist), the URL is provided to the content fetcher 104, which obtains a screenshot of the webpage to which the URL resolves, as discussed above with respect to the training process in accordance with FIG. 1. The content fetcher 104 then provides the screenshot of the webpage (e.g., an image file, or an identifier enabling, retrieval of the image file) to the feature generation logic 106. The feature generation logic 106 uses computer vision techniques to detect keypoints within the screenshot. The feature generation logic 106 extracts blocks of pixels from the screenshot having a predetermined size, e.g., a 16×16 block, that includes the keypoint. Each block of pixels is then used to generate a keypoint descriptor for the keypoint included within the block of pixels as discussed above. The plurality of keypoint descriptors describing the keypoints detected within a screenshot is stored in a vector, referred to herein as a "feature vector." Specifically, the feature vector represents a description of the keypoints of the subject screenshot. The feature vector is then provided to the classifier 112.

The classifier 112 uses the feature vector of the subject screenshot as an input to the model generated during training. Analyzing the feature vector of the subject screenshot using the model results in a plurality of confidences. Each confidence of the plurality of confidences corresponds to a separate webpage family of the URLs provided to the PDAS 400 during training ("the training set"). As an illustrative example, when the training set includes URLs for Bank of America, Wells Fargo, First Republic, and other known banking webpages for a total of twenty (20) banking webpages in the training set, the analysis of the feature vector of the subject screenshot during the detection process may result in 20 confidences. Specifically, a first confidence may correspond to the Bank of America webpage, a second confidence may correspond to the Wells Fargo webpage, etc., with each confidence indicating the likelihood that the subject webpage is attempting to mimic the webpage corresponding to the webpage family. Continuing the example, the first confidence indicates the likelihood that the subject webpage is attempting to mimic the Bank of America webpage based on how closely the subject webpage resembles the "look and feel" of the Bank of America webpage.

The webpage family having the highest confidence may be passed to the image comparator 120, which performs an image comparison between the subject screenshot and the webpage corresponding to the webpage family with the highest confidence. The image comparison may perform an in-depth comparison of keypoints according to the keypoint descriptors within the feature vector of the subject screenshot with the keypoints of the webpage corresponding to the webpage family having the highest confidence to determine how closely the subject screenshot matches the webpage corresponding to the webpage family having the highest confidence. When the image comparison results in a match above a predefined threshold, the PDAS 400 determines that the subject webpage and the subject URL itself are part of a phishing attack.

When the subject URL and the subject webpage are determined to be part of a phishing attack, the reporting engine 122 generates an alert to a cybersecurity analyst, an administrator, and/or users of one or more endpoints indicating that the subject URL and subject webpage are part of a phishing attack.

In additional embodiments, a webpage family may include a plurality of webpages (e.g., Bank of America login webpages) that vary slightly. In such an embodiment, during the training process, the feature domain mapper 108 may label the feature vectors of the two or more webpages with the same webpage family and the feature vectors may be mapped to the same hyperplane during the generation of the model by the training module 110.

In some embodiments, two webpage families may correspond to the same overall webpage "owner." For example, as Bank of America may have multiple login webpages for which the "look and feel" differs, a first Bank of America login webpage may include two text boxes corresponding to an entry of a customer's username and password, while a second Bank of America login webpage may include three text boxes corresponding to an entry of a customer's email address, social security number and birthday. Thus, for purposes of the training and detection processes, the first and second Bank of America differ in terms of their "look and feel" and may be afforded separate webpage families. However, both webpage families may be linked to Bank of America for the detection process.

Figure 3A:
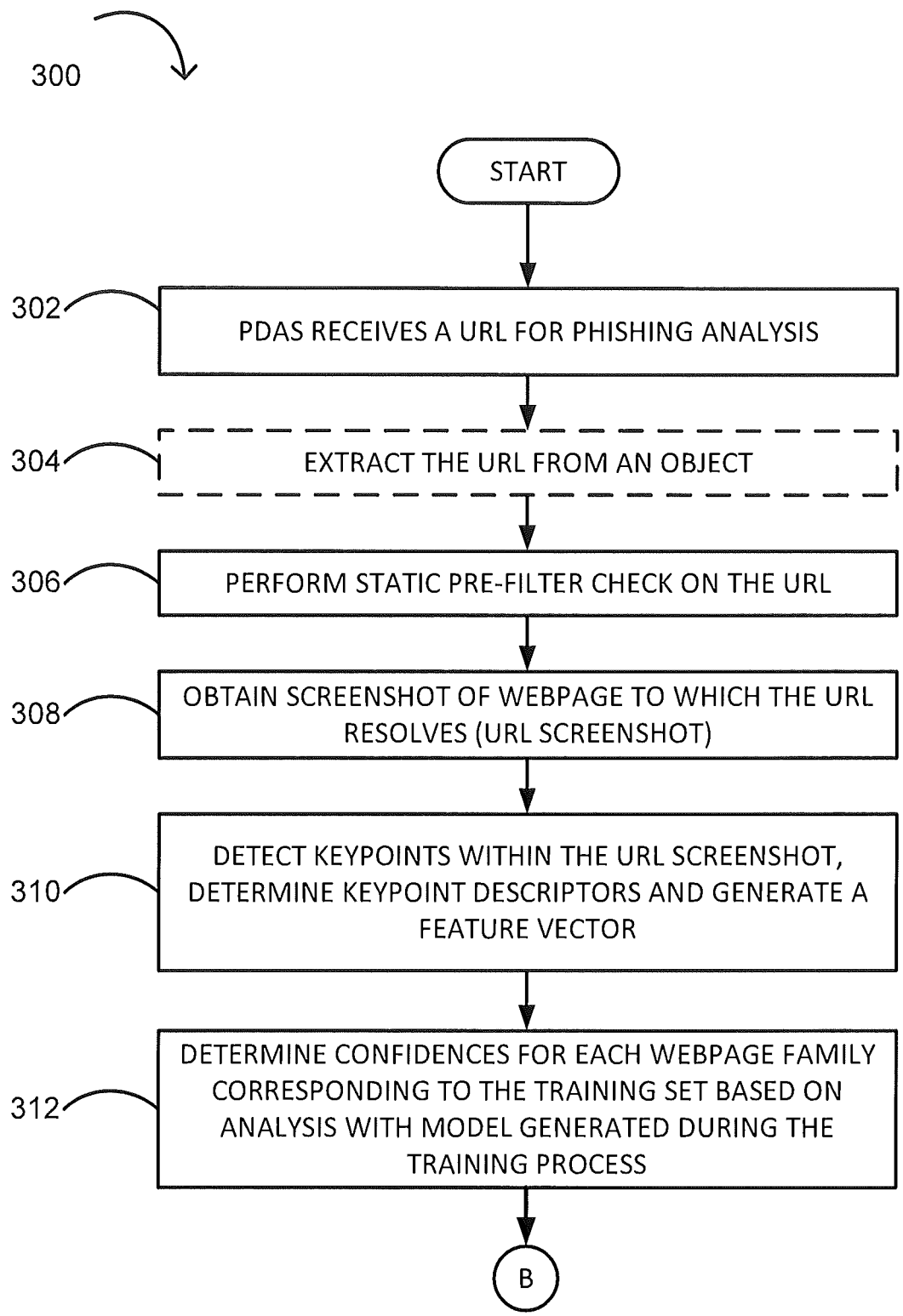
FIGS. 3A-3B provide a flowchart illustrating an exemplary method for analyzing a URL by the PDAS of FIG. 4 to determine whether the URL is associated with a phishing attack.
Figure 3B:
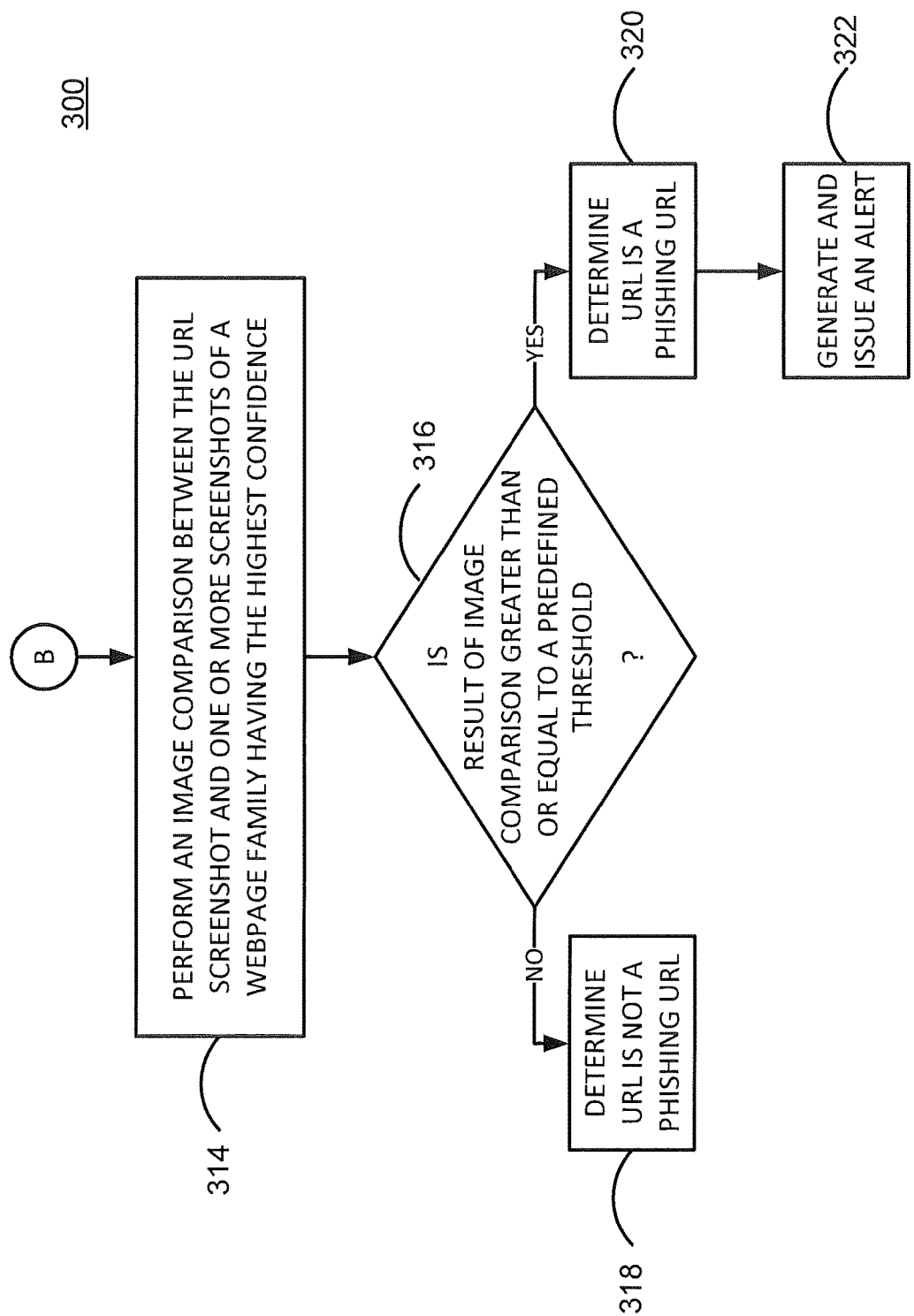

Referring to FIGS. 3A-3B, a flowchart illustrating an exemplary method for analyzing a URL by the PDAS of FIG. 4 to determine whether the URL is associated with a phishing attack is shown. Each block illustrated in FIGS. 3A-3B represents an operation performed in the method 300 of detecting whether a URL is associated with a phishing attack by the phishing detection and analysis system (PDAS). Herein, the method 300 starts when the PDAS receives an object for phishing analysis (block 302). In one embodiment, the object may be a URL for analysis. However, in an alternative embodiment, the object may be, for example, an email message (email) wherein the content of the email includes a URL. In such an embodiment in which the object is an email, the method 300 may include an optional step of extracting the URL from the email (optional block 304).

Subsequently, the method 300 includes an operation of performing a pre-filter check on the URL (block 306). In one embodiment, the pre-filter check includes a static analysis of the URL, which may include, but is not limited to, a comparison with one or more entries of a whitelist and/or a comparison with one or more entries of a blacklist. In some embodiments, when the object is deemed suspicious and/or cannot be determined to be either benign or phishing, the method 300 continues analysis of the object by obtaining a screenshot of the webpage to which the URL resolves ("URL screenshot" as mentioned above) (block 308).

Upon obtaining the URL screenshot, the method 300 detects keypoints within the URL based on computer vision techniques and determines keypoint descriptors. Based on the keypoints and the determined keypoint descriptors, a feature vector is generated that includes the keypoints and their keypoint descriptors (block 310). The keypoints may include, inter alia, regions on the URL screenshot that are high-contrast regions of the URL screenshot. In one embodiment, a high-contrast region may refer to a set of two or more pixels such that a change in greyscale value is greater than or equal to a predefined threshold of two neighboring pixels. Additionally, in some embodiments, the URL screenshot may be in color and in such embodiments, the detection may include detection of a variance in color hues above a predefined threshold (e.g., a change in red, green, yellow, and blue values defining the pixel).

The feature vector is provided to a classifier, e.g., the classifier 112 as seen in FIGS. 1-2, and analyzed according to the model generated during the training process as discussed above. The analysis of the feature vector with the model results in a determination of a confidence for each feature vector included in the training set of URLs (block 312).

The webpage having the highest confidence based OD the analysis using the model is provided to, e.g., the CV image comparator 120 as seen in FIG. 2, which performs an image comparison between the URL screenshot and a screenshot of the webpage corresponding to the feature vector having the highest confidence (block 314). When the result of the image comparison is less than a predefined threshold, e.g., indicating a match of the two screenshots does not meet the predefined threshold (no at block 316), the method 300 determines the subject URL is not a phishing URL (block 318).

However, when the result of the image comparison is greater than or equal to the predefined threshold e.g., indicating a match of the two screenshots meets or exceeds the predefined threshold (yes at block 316), the method 300 determines the subject URL is a phishing URL (block 320) and subsequently generates and issues an alert (block 322). The alert may be issued to, for example, a user attempting to access the URL using an endpoint device, a network administer and/or a cybersecurity analyst.

FIG. 4 is an exemplary embodiment of a logical representation of the phishing detection and analysis system of FIG. 1. The phishing detection and analysis system (PDAS) 400, in an embodiment, may be stored on a non-transitory computer-readable storage medium of an endpoint device that includes a housing, which may be made entirely or partially of a hardened material (e.g., hardened plastic, metal, glass, composite or any combination thereof) that protects the circuitry within the housing, namely one or more processors 402 that are coupled to a communication interface 404 via a first transmission medium 406. The communication interface 404, in combination with a communication logic 412, enables communications with external network devices and/or other network appliances to receive updates for the PDAS 400. According to one embodiment of the disclosure, the communication interface 404 may be implemented as a physical interface including one or more ports for wired connectors. Additionally, or in the alternative, the communication interface 404 may be implemented with one or more radio units for supporting wireless communications with other electronic devices. The communication interface logic 412 may include logic for performing operations of receiving and transmitting one or more objects via the communication interface 404 to enable communication between the PDAS 400 and network devices via a network (e.g., the internet) and/or cloud computing services, not shown.

The processor(s) 402 is further coupled to a persistent storage 410 via a second transmission medium 408. According to one embodiment of the disclosure, the persistent storage 410 may include the following logic as software modules: the pre-filter 116, the URL extractor 114, the content fetcher 104, the feature generation logic 106, the feature domain mapper 108, the training module 110, the classifier 112, the image comparator 120, the reporting engine 122, and the communication interface logic 412. The operations of these software modules, upon execution by the processor(s) 402, are described above. The whitelist/blacklist database 118 is stored data for access by the pre-filter 116. Of course, it is contemplated that some or all of this logic may be implemented as hardware, and if so, such logic could be implemented separately from each other.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for analyzing a subject Uniform Resource Locator (URL) by a phishing detection and analysis system (PDAS) to determine whether the subject URL is associated with a phishing attack, the PDAS including one or more processors and a storage medium, the method comprising:

performing, by the PDAS, a first set of operations including:
detecting a plurality of keypoints within a subject screenshot of a subject webpage corresponding to the subject URL;

providing the plurality of keypoints to a machine learning model, wherein the machine learning model is a representation of relationships between a set of training feature vectors representing a training set of URLs, each of the training feature vectors corresponds to a separate webpage family within a set of webpage families;

executing the machine learning model using the plurality of keypoints as input to the machine learning model to determine a set of confidences, wherein each confidence within the set of confidences reflects a potential relationship between the subject screenshot and a webpage family within the set of webpage families, and wherein a first webpage family within the set of webpage families is associated with a highest confidence of the set of confidences;

performing, by the PDAS, a second set of operations including:

performing an image comparison between the subject screenshot and one or more screenshots corresponding to webpages within the first webpage family;

determining whether a result of the image comparison exceeds a predefined threshold;

responsive to the determining that the result of the image comparison exceeds the predefined threshold, generating an alert or report indicating that the subject URL is associated with the phishing attack.

2. The computerized method of claim 1, further comprising:

receiving, by the PDAS, the subject URL; and obtaining, by the PDAS, the subject screenshot of the subject webpage corresponding to the subject URL.

3. The computerized method of claim 1, further comprising:

performing, by the PDAS, a pre-filter check on the subject URL, the pre-filter check including one or more static analyses.

4. The computerized method of claim 1, further comprising:

determining, by the PDAS, from the subject screenshot, one or more keypoint descriptors for each of the plurality of keypoints, each of the one or more keypoint descriptors including one or more parameters of a keypoint of the plurality of keypoints; and generating, by the PDAS, a feature vector including the plurality of keypoints and the one or more keypoint descriptors for each of the plurality of keypoints, wherein determining, by the PDAS, the set of confidences includes analyzing the feature vector accordingly to the machine learning model.

5. The computerized method of claim 1, wherein the image comparison includes:

retrieving, by the PDAS, previously determined keypoints of a first screenshot of the one or more screenshots; and correlating, by the PDAS, the previously determined keypoints of the first screenshot with the plurality of keypoints of the subject screenshot.

6. The computerized method of claim 1, wherein the subject screenshot includes image data of the subject webpage that is configured to be displayable on a computer screen.

7. The computerized method of claim 1, wherein each keypoint of the plurality of keypoints includes an image region having a known orientation within a set of pixels representing the subject screenshot.

8. The computerized method of claim 1, wherein a first confidence corresponds to a likelihood that the subject webpage is mimicking a first screenshot of a first webpage of the first webpage family, the first confidence included within the set of confidences.

9. The computerized method of claim 1, wherein the machine learning model is generated and trained with a plurality of screenshots of each of a plurality of webpages using a combination of an internet browser and an operating system.

10. The computerized method of claim 1, wherein the performing of the image comparison includes:

performing the image comparison between the subject screenshot and one or more screenshots corresponding to webpages of the first webpage family until a result of an image comparison is greater than or equal to the predefined threshold.

11. The computerized method of claim 1, wherein the responsive to the determining that the result of the image comparison exceeds the predefined threshold includes transmitting the alert or report to one or more of a user of an endpoint device or an analyst.

12. The computerized method of claim 1, wherein the executing of the machine learning model indicates that a plurality of webpage families are closely correlated with the subject screenshot and the performing the image comparison is between the subject screenshot and a screenshot of at least one webpage from each of the set of webpage families including the one or more screenshots corresponding to the webpages within the first webpage family.

13. The computerized method of claim 1, further comprising:

responsive to the determining that the result of the image comparison is below the predefined threshold, indicating that the subject URL is not associated with the phishing attack.

14. A non-transitory computer-readable medium, when processed by one or more processors, analyzes a subject Uniform Resource Locator (URL) to determine whether the subject URL is associated with a phishing attack, the non-transitory computer readable medium comprising:

a feature generation logic module that, when executed by the one or more processors, detects a plurality of keypoints within a subject screenshot of a subject webpage corresponding to the subject URL and generates a subject feature vector that includes the detected plurality of keypoints;

a classifier logic module that, when executed by the one or more processors, executes a machine learning model using the detected the plurality of keypoints as input to the machine learning model to determine a set of confidences, wherein each confidence of the set of confidences reflects a potential relationship between the subject screenshot and a first webpage family within a set of webpage families, and wherein the first webpage family within the set of webpage families is associated with a highest confidence of the set of confidence, wherein the machine learning model is a representation of relationships between a set of training feature vectors representing a training set of URLs, each of the training feature vectors corresponds to a separate webpage family within the set of webpage families;

an image comparator logic module that, when executed by the one or more processors, (i) performs an image comparison between the subject screenshot and one or more screenshots corresponding to webpages within the first webpage family, and (ii) determines whether a result of the image comparison exceeds a predefined threshold; and a reporting logic module that, when executed by the one or more processors, responsive to the image comparator logic module determining that the result of the image comparison exceeds the predefined threshold, generates an alert or report indicating that the subject URL is associated with the phishing attack.

15. The computer-readable medium of claim 14, wherein the subject screenshot is captured as an image file.

16. The computer-readable medium of claim 14, further comprising: a content fetcher logic module that, when executed by the one or more processors, obtains the subject screenshot by accessing a data caching system that stores one or more previously captured screenshots.

17. The computer-readable medium of claim 14, further comprising:
a pre-filter logic module that, when executed by the one or more processors, performs static scanning the subject URL including an analysis of one or more of a blacklist or white list.

18. The computer-readable medium of claim 14, wherein the image comparison includes:
retrieving previously determined keypoints of a first screenshot of a first webpage; and
correlating the previously determined keypoints of the first screenshot with the detected keypoints of the subject screenshot.

19. The computer-readable medium of claim 14, wherein each keypoint of the detected keypoints includes an image region having a known orientation within a set of pixels representing the subject screenshot.

20. The computer-readable medium of claim 14, wherein the machine learning model includes a representation of a correlation of the set of training feature vectors,
wherein a first feature vector corresponds to a first webpage corresponding to a first webpage family of a set of webpage families.

21. The computer-readable medium of claim 14, wherein the machine learning model is generated and trained with a plurality of screenshots of each of a plurality of webpages using a combination of an internet browser and an operating system.

22. The computer-readable medium of claim 14, wherein the performing of the image comparison includes:
performing the image comparison between the subject screenshot and one or more screenshots corresponding to webpages of the first webpage family until a result of an image comparison is greater than or equal to the predefined threshold.

23. The computer-readable medium of claim 14, wherein the responsive to the determining that the result of the image comparison exceeds the predefined threshold includes transmitting the alert or report to one or more of a user of an endpoint device or an analyst.

24. The computer-readable medium of claim 14, wherein the executing of the machine learning model indicates that a plurality of webpage families are closely correlated with the subject screenshot and the performing the image comparison is between the subject screenshot and a screenshot of at least one webpage from each of the set of webpage families including the one or more screenshots corresponding to the webpages within the first webpage family.

25. The computer-readable medium of claim 14, further comprising:
responsive to the determining that the result of the image comparison is below the predefined threshold, indicating that the subject URL is not associated with the phishing attack.

26. A non-transitory computer-readable medium, when processed by one or more processors, generates a machine learning model used in determining whether a subject Uniform Resource Locator (URL) is associated with a phishing attack, the non-transitory computer readable medium comprising:
a feature generation logic module that, when executed by the one or more processors, for each screenshot corresponding to a URL within a set of training URLs detects keypoints within each screenshot and generates a feature vector for each screenshot that includes the detected keypoints of the corresponding screenshot;
a domain mapper logic module that, when executed by the one or more processors, receives each feature vector generated by the feature generation logic module and labels each feature vector according to a webpage family of the screenshot to which the feature vector corresponds to generate a plurality of labeled feature vectors; and
a training module logic that, when executed by the one or more processors, generates the machine learning model including a digitized representation of a correlation of the plurality of labeled feature vectors corresponding to the set of training URLs, wherein the machine learning model is a representation of relationships between a set of training feature vectors representing the set of training URLs, each of the training feature vectors corresponds to a separate webpage family within a set of webpage families, and wherein execution of the machine learning model using a plurality of keypoints of a subject screenshot as input determines a set of confidences, wherein each confidence within the set of confidences reflects a potential relationship between the subject screenshot and a webpage family within the set of webpage families, and wherein a first webpage family within the set of webpage families is associated with a highest confidence of the set of confidences; and
an image comparison logic module that, when executed by the one or more processors, (i) performs an image comparison between the subject screenshot and one or more screenshots corresponding to webpages within the first webpage family, and (ii) determines whether a result of the image comparison exceeds a predefined threshold.

27. The computer-readable medium of claim 26, wherein the subject screenshot is captured as an image file.

28. The computer-readable medium of claim 26, wherein the feature generation logic module uses at least one computer vision technique to detect the keypoints within each screenshot.

29. The computer-readable medium of claim 26, wherein the machine learning model represents one or more hyperplanes onto which features of each feature vector are categorized.

30. The non-transitory computer-readable medium of claim 26, further comprising:
a content fetcher logic module that, when executed by the one or more processors, obtains a screenshot of a website corresponding to each URL within the set of training URLs, the set of training URLs including URLs determined as likely to be targeted for phishing attacks, wherein each screenshot is obtained using a different combination of an internet browser and an operating system.

31. The computer-readable medium of claim 30, wherein the content fetcher logic module obtains a first screenshot by accessing a data caching system that stores one or more previously captured screenshots.

32. The non-transitory computer-readable medium of claim 26, further comprising:
   a reporting logic module that, when executed by the one or more processors, responsive to the image comparator logic module determining that the result of the image comparison exceeds the predefined threshold, generates an alert or report indicating that the subject URL is associated with the phishing attack.

* * * * *